United States Patent [19]

Greene et al.

[11] 4,055,908
[45] Nov. 1, 1977

[54] READING DEVICE

[76] Inventors: Daniel H. Greene, 15910 Ventura Blvd., Encino, Calif. 91324; Lawrence J. Greene, 1031 Foster City Blvd., Foster City, Calif. 94404

[21] Appl. No.: 677,322

[22] Filed: Apr. 15, 1976

[51] Int. Cl.² ............................................. G09B 17/02
[52] U.S. Cl. ...................................... 35/35 R; 40/352
[58] Field of Search ............ 35/35 R, 35 B, 38, 9 EF; 40/341, 352

[56]  References Cited

U.S. PATENT DOCUMENTS

| 1,521,491 | 12/1924 | Walker | 35/35 R |
|---|---|---|---|
| 2,116,164 | 5/1938 | Taylor et al. | 35/35 B |
| 2,565,608 | 8/1951 | Hoff | 35/38 X |
| 2,745,313 | 5/1956 | Taylor | 35/35 B X |
| 2,758,393 | 8/1956 | Levy | 35/35 B |
| 2,840,926 | 7/1958 | Campbell | 35/35 B |
| 3,386,191 | 6/1968 | Michel | 35/38 |
| 3,713,230 | 1/1973 | Essmann | 35/38 |

FOREIGN PATENT DOCUMENTS

| 177,489 | 12/1923 | United Kingdom | 35/35 B |

*Primary Examiner*—William H. Grieb
*Attorney, Agent, or Firm*—Marvin E. Jacobs

[57]  ABSTRACT

A shutter is slidingly mounted in a frame which exposes a single line of words on a page of printed material. The shutter may be moved from left to right across the exposed line exposing words, syllables or the like sequentially.

9 Claims, 7 Drawing Figures

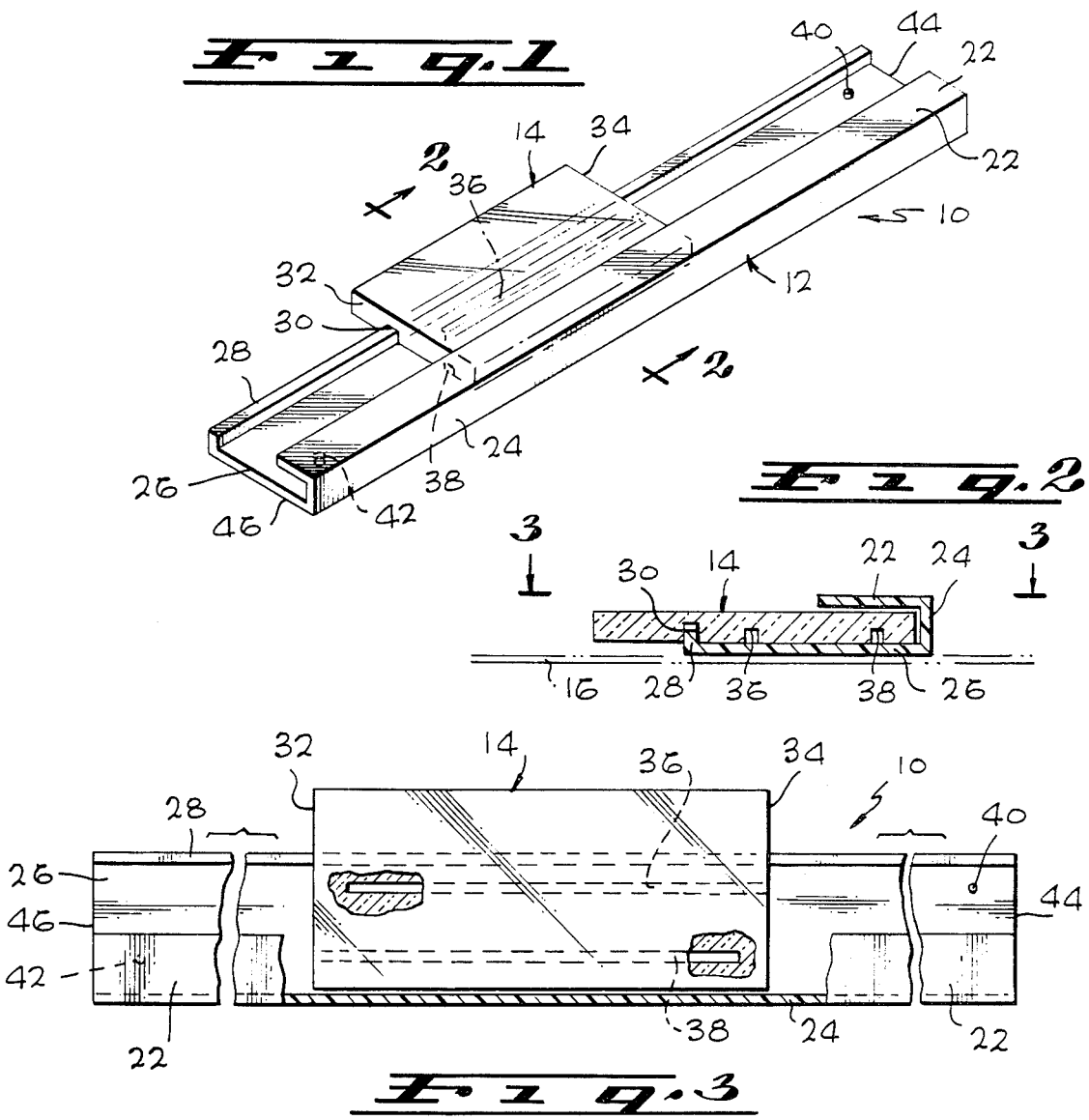
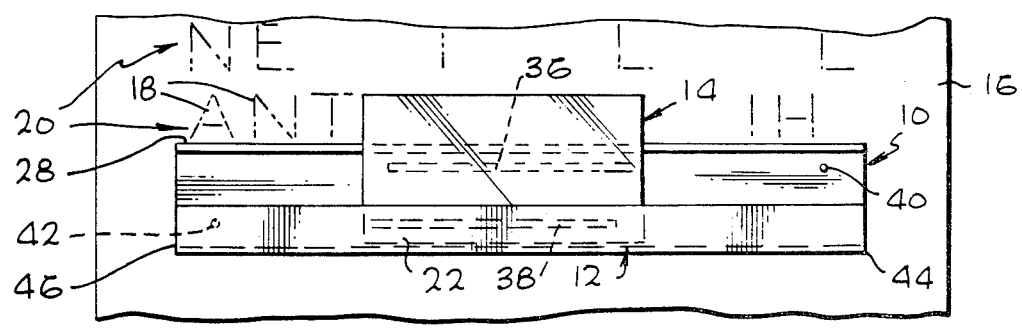

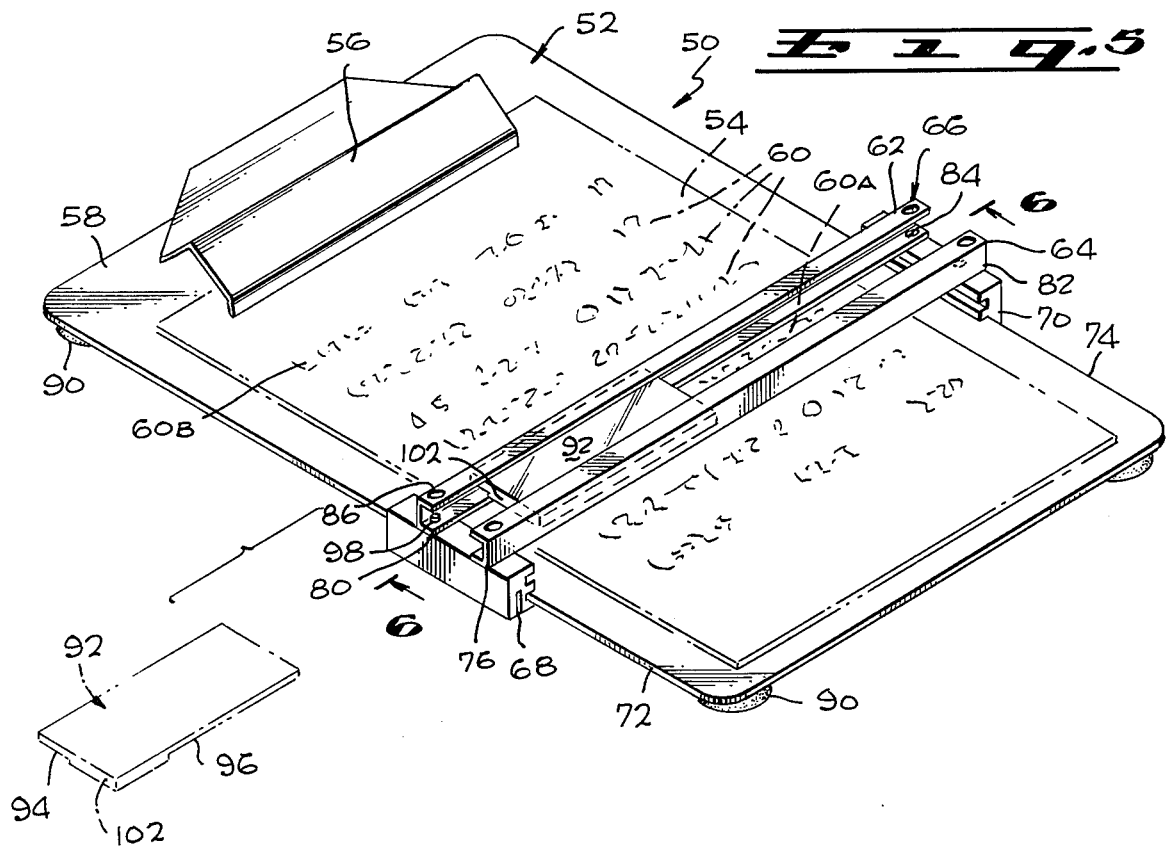
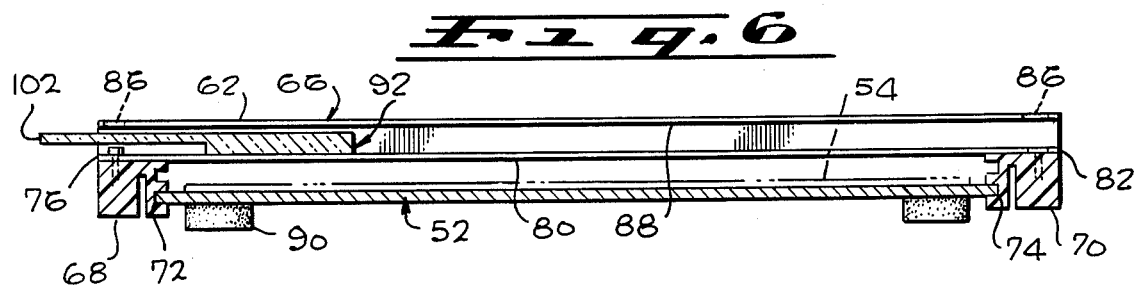
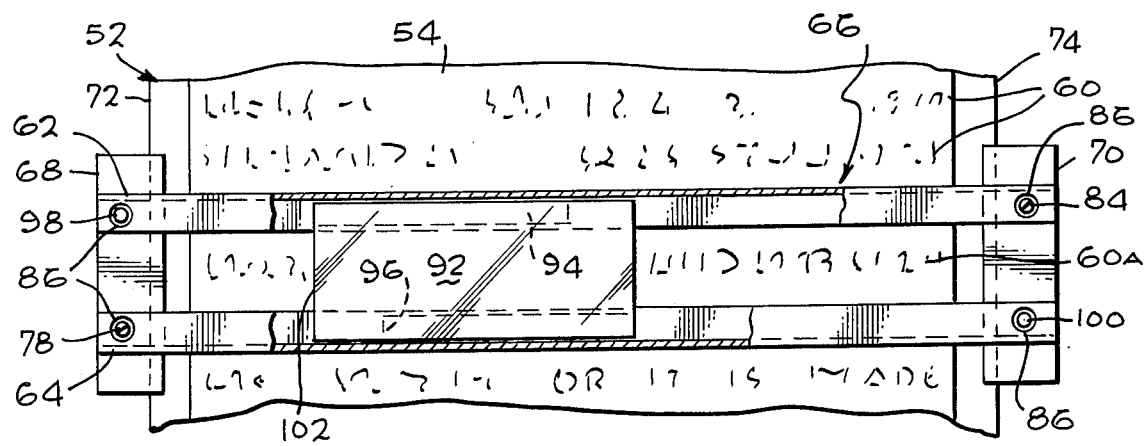

READING DEVICE

BACKGROUND OF THE INVENTION

1. Field of the Invention.

The present invention relates to a reading device, more particularly, to a new and useful reading device for training readers to improve reading skills.

2. Description of the Prior Art.

One of the most common symptoms of a perceptual learning disability is that of difficulty with visual tracking; that is, difficulty controlling the lateral or horizontal movement of the eyes across a line of printed symbols or words. Visual tracking difficulties reflect a lack of proper opthomuscular control. Children with this problem frequently reverse letters and numbers (dislexia). They will have difficulty attacking words and blending sounds together. When confronted with a multi-syllabic word, they will often leave many of the syllables out and consequently mispronounce the word. It is common for them to skip over an entire word as they attempt to read, and as a consequence, their comprehension invariably suffers.

Additionally, some non-handicapped readers are slow readers because they have never trained thier eyes to move quickly across a printed line.

SUMMARY OF THE INVENTION

A new and useful reading device is designed to develop opthomuscular control in children with visual tracking deficits as their hand helps control the lateral movement of their eyes across the printed line, thereby training the muscles of the eye to flow more smoothly from left to right.

In a first form of the device, a partially transparent tinted plastic shutter is slidingly mounted in a frame. The frame may be conveniently manufactured by cutting out a one-eighth inch channel along the top of a square-channel aluminum tube. The remaining portion acts as a guide for a continuous groove provided in the shutter. The shutter may also be provided with opposing dead-end grooves which engage stop pins provided in the ends of the tube to prevent running the shutter out of the frame from either end. The frame includes an upper edge which may be placed beneath a line of printed material on a paper. The shutter may then be moved slowly from left to right using the left edge of the shutter to sequentially expose syllables. The reading device of the invention is adapted to include shutters of varying opacity including opaque shutters for use in the therapy of various learning disorders.

In a second form of the invention, the printed paper may be placed on a clipboard having nylon slides on each side joined by a metal frame for the shutter. The nylon slides facilitate moving the frame down the printed page exposing one line at a time. The clipboard may be supported on suitable feet which hold the clipboard above a supporting surface so that the nylon slides will have clearance.

The edge of the semi-transparent, tinted shutter allows the user to isolate and attack each syllable of a word in its proper sequence while at the same time the shutter's semi-transparent nature enables him to blend a preceding syllable with a subsequent syllable and/or the entire word as he moves the shutter laterally.

Both embodiments of the device may be used both as a training device for specified periods each day, or they may be used for a variety of remedial reading tasks that may confront the perceptually-handicapped child or adult.

Both forms of the device may also be used to increase reading speed in non-handicapped readers. By placing the right edge of the shutter to the left of the first word on the line and by manually pushing the shutter from left to right, the reader may train his eyes to move more quickly across the printed line. This is the essence of speed reading courses.

The features of the present invention which are believed to be novel are set forth with particularity in the appended claims. The present invention, both as to its organization and manner of use, together with the objects and advantages thereof, may best be understood by reference to the following description, taken in connection with the accompanying drawings in which like reference characters refer to like elements in the several views.

BRIEF DESCRIPTION OF THE DRAWINGS

FIG. 1 is a perspective view of a reading device constituting a first embodiment of the present invention;

FIG. 2 is a cross-sectional view of the device taken along line 2—2 of FIG. 1;

FIG. 3 is a cross-sectional view of the device taken along line 3—3 of FIG. 2;

FIG. 4 is a plan view of the device of FIG. 1 in position on a printed page;

FIG. 5 is a perspective view of a reading device constituting a second embodiment of the present invention;

FIG. 6 is a cross-sectional view of the device taken along line 6—6 of FIG. 5; and FIG. 7 is a partial plan view of the device looking in along line 7—7 of FIG. 6.

DESCRIPTION OF THE PREFERRED EMBODIMENTS

Referring again to the drawings, and more particularly to FIGS. 1-4, a reading device constituting a first embodiment of the present invention, generally designated 10, includes a frame 12 in which a shutter 14 is slidingly mounted for manual movement across a printed page 16 (FIG. 4) so that a reader may attack selected portions 18 of a single line of material 20 which is isolated on page 16 by frame 12.

Frame 12 includes a front wall 22, a bottom wall 24, a rear wall 26 and a top wall 28. If desired, frame 12 may be manufactured from a ¼ × 1 inch square-channel aluminum tube from which a one-eighth inch section has been removed so that top wall 28 will be about one-eighth inch shorter than bottom wall 24. Top wall 28 then serves as a runner for shutter 14 by engaging a slot 30 provided in shutter 14 and extending from its left edge 32 to its right edge 34.

Shutter 14 is also provided with an upper dead-end groove 36, which has its right end open and its left end closed, and a lower dead-end groove 38, which has its left end open and its right end closed; these grooves are adapted to engage stop pins 40, 42, respectively, which are provided on the right end 44 and the left end 46 of frame 12, respectively, so that the closed end of each slot 36, 38 will bottom-out against its associated pin when shutter 14 reaches the end of its travel in frame 12.

Shutter 14 may be made from a semi-transparent tinted plastic material so that a user may see complete words in line 20, while at the same time the tinted color encourages the user to attack the exposed portion 18 or syllable of the word in its proper sequence. The left edge 32 of shutter 14 isolates each portion or syllable and enables the user to blend a preceding syllable with a subsequent syllable as he manually moves shutter 14 laterally from the left edge 46 of frame 12 to the right edge 44 thereof. Top wall 28 of frame 12 forms a straight edge for isolating a single line 20.

A number of different parameters for frame 12 and shutter 14 will manifest themselves to those skilled in the art. For example, when device 10 is used with printed material on letter-sized paper, frame 12 may be about 8 inches long and shutter 14 may be about ¼ × 4 × 1½ inches.

Referring now to FIGS. 5-7, a reading device constituting a second embodiment of the present invention, generally designated 50, includes a clipboard 52 to which a printed page of material 54 may be affixed by a spring-loaded clip 56 affixed to the upper end 58 of clipboard 52.

Page 54 carries a plurality of lines 60 of printed material of which a single line 60A may be isolated between the upper rail 62 and the lower rail 64 of a frame assembly 66 including a pair of nylon slides 68, 70 slidingly connecting frame 66 to the left edge 72 and the right edge 74, respectively, of clip-board 52.

The rails 62, 64 are each substantially U-shaped in cross-section; each includes a left end 76 affixed to slide 68 by a suitable fastener 78, 98 connecting the lower leg 80 of an associated one of the rails 62, 64 to slide 68; each rail 62, 64 also includes a right end 82 affixed to slide 70 by a suitable fastener 84, 100 connecting lower rail 80 to slide 70. Fasteners 78, 84, 98, 100 may be installed by passing them through suitable apertures 86 provided in the upper legs 88 of rails 62;, 64. Fasteners 78, 84 are flat or recessed with the surface of the lower leg of the rail 62, 64 and fasteners 98, 100 protrude therefrom to form left-right stops as will be described below.

Clipboard 52 may be supported on a suitable surface (not shown) by suitable plastic feed, like the ones shown at 90, which are of sufficient height to maintain slides 68, 70 above the supporting surface. The lower feet 90 may be removed and frame assembly 66 slid off clipboard 52 to function as a hand-held reading device as in FIGS. 1-4.

Reading device 50 also includes a shutter 92 which may be made from a suitable semi-transparent tinted plastic material and which is slidingly mounted in frame 66 between upper legs 88 and lower legs 80 for sliding movement from left edge 72 to the right edge 74 of clipboard 52. Shutter 92 may be provided with an upper dead-end groove 94 and a lower dead-end groove 96. The grooves 94, 96 are formed between an L-shaped cut-out from the rear face of the shutter. The inner edge of the rail 62, 64 forms the outer guiding edge of the groove 92, 94. The grooves 92, 94 are engageable with protruding fasteners 98, 100, respectively, affixed to the left end 76 and the right end 82, respectively, of frame 66 for stopping shutter 92 when it reaches the end of its travels between edges 72, 74 of clip-board 52. Shutter 92 includes a left edge 102 which may be placed to the right of the first syllable on printed line 60A. A user of device 50 may then manually move shutter 92 from left to right exposing each syllable sequentially.

Clipboard 52 may be nine inches wide and thirteen inches long and shutter 92 may have the same dimensions as those used for shutter 14 in the first embodiment. The bight portions of rails 62, 64 may be spaced 1½ inches apart to accommodate shutter 92 and the rails may be supported approximately one-eighth inch above clipboard 52 by slides 68, 70.

In use, frame assembly 66 may be slid toward the upper edge 58 of clipboard 52 until the top line 60B of the printed material on page 54 is centered between rails 62, 64. The left edge 102 of shutter 92 may then be positioned to the left of the portion of line 60B which it is desired to isolate. Shutter 92 may then be manually moved to the right uncovering selected portions of line 60B sequentially. Stop fastener 100 will stop shutter 92 when its left edge reaches the end of line 60B. Frame 66 may then be moved downwardly on clipboard 52 to isolate the next line of printed material; shutter 92 may be moved to the left until its left edge 102 exposes the first portion of the printed material to be read.

While the particular reading devices herein shown and described in detail are fully capable of attaining the objects and providing the advantages hereinbefore stated, it is to be understood that they are merely illustrative of the presently-preferred embodiments of the invention and that no limitations are intended to the details of construction or design herein shown other than as defined in the appended claims, which form a part of this disclosure.

Whenever the term "means" is employed in these claims, this term is to be interpreted as defining the corresponding structure illustrated and described in this specification or the equivalent of the same.

What is claimed is:

1. A device for training people to improve reading skills, comprising:

means for isolating a single line of reading material to be read from a page containing a plurality of lines of readable material including a frame having an open left end, and open right end and having at least one elongated member defining a trough between said open ends, one of said members having an edge underlying said single line of reading material, and said frame including a first stop pin mounted on the left end of the frame and a second stop pin mounted on the right end of the frame; and shutter means slidingly mounted in the trough of said isolating means for sequentially uncovering portions of said single line of reading material, whereby a reader may attack selected portions of said single line of material as said shutter means is moved from left to right on said isolation means, said shutter having a left edge and a right edge, each of said edges being capable of movement out of said open ends so that the opposite edge is positioned near the edge of the printed margin of the page, said left edge of said shutter being adapted to uncover portions of said line sequentially as said shutter is slid laterally along in said trough, said shutter being provided with an upper dead end groove and a lower dead end groove, said upper dead end groove being open adjacent one ege of the shutter in alignment with one of said pins and being closed between said edges in a location permitting movement of the opposite edge of the shutter past one margin of the page, said lower dead end groove being open adjacent the other edge of the shutter in aligment with the other pin and being closed between said edges in a location permitting movement of the opposite edge of the shutter past the other margin of the page.

2. A device as stated in claim 1 wherein said shutter means is semi-transparent so that said reader may see a selected portion of said single line of material while attacking the individual parts of said selected portion in proper sequence.

3. A device as stated in claim 1 in which the shutter means is opaque.

4. A reading device as stated in claim 1 wherein said isolating means is a frame which comprises:
a square-channel tubular member having a front wall, a bottom wall, a rear wall, and a top wall; a portion of said top wall being cut away so that said top wall forms a runner for said slidably-mounted means.

5. A reading device as stated in claim 1 wherein said frame comprises:
upper and lower U-shaped rails defining opposed troughs;
a pair of first and second slides for engaging each side edge of a rigid page-holding board; and
means affixing one end of each rail to one of said slides and the other ends of said rails to the other of said slides.

6. A reading device as stated in claim 5 further comprising:
a clipboard to which said page of reading material may be affixed, said clipboard having an upper end, a lower end, a left edge and a right edge;
said first slide slidingly mounted on said left edge of said clipboard;
said second slide slidingly mounted on said right edge of said clipboard;
said upper and lower U-shaped rails being affixed to said slides in spaced apart relationship with their openings facing each other; and
the shutter being slidingly mounted in said openings in said rails, said shutter having a left edge for isolating said portions of said single line sequentially when said single line is positioned between said rails.

7. A reading device as stated in claim 1 in which said frame has a front wall, a bottom wall, a rear wall and a top wall, said rear wall being adapted to be placed on said printed page in a manner such that said top wall forms a straight edge beneath said single line, said top wall extending from said rear wall to a position closely adjacent said front wall; and
said shutter being provided with a groove engaging said top wall of said frame behind said front wall, whereby said top wall serves as a runner for said shutter.

8. A device as stated in claim 1 wherein said frame comprises:
upper and lower U-shaped rails;
a pair of first and second members; and
means affixing one end of each rail to one of said end members and the other end of said rails to the other of said end members such that the rails are affixed in a spaced, parallel relationship with their trough openings facing each other.

9. A device according to claim 8 in which the upper end of said affixing means defines said stop pins.

* * * * *